United States Patent
Wolf et al.

(10) Patent No.: US 9,043,336 B2
(45) Date of Patent: May 26, 2015

(54) METHODS AND SYSTEMS FOR GLOBAL KNOWLEDGE SHARING TO PROVIDE CORRECTIVE MAINTENANCE

(75) Inventors: Erik Wolf, Mesa, AZ (US); Jeremy Spaur, Longview, WA (US); Alon Sagie, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 299 days.

(21) Appl. No.: 12/853,217

(22) Filed: Aug. 9, 2010

(65) Prior Publication Data

US 2011/0047150 A1    Feb. 24, 2011

Related U.S. Application Data

(60) Provisional application No. 61/232,406, filed on Aug. 7, 2009.

(51) Int. Cl.
*G06F 7/00*     (2006.01)
*G05B 23/02*    (2006.01)
*G06F 11/22*    (2006.01)

(52) U.S. Cl.
CPC ........ *G05B 23/0283* (2013.01); *G06F 11/2257* (2013.01); *G06F 11/2294* (2013.01)

(58) Field of Classification Search
USPC ............. 707/706, 723, 748; 438/14; 716/136; 702/83, 117
See application file for complete search history.

(56) References Cited

U.S. PATENT DOCUMENTS 4,358,824 A  * 11/1982 Glickman et al. ............... 1/1
6,885,977 B2 *  4/2005 Gavra et al. ................. 702/185
2004/0034614 A1*  2/2004 Asher et al. .................. 707/1

OTHER PUBLICATIONS

Crow et al. (WO 2005/038584.*
Data mining for yield enhancement in semiconductor manufacturing and an empirical study Chen-Fu Chien, Wen-Chih Wang, Jen-Chieh Cheng (Jul. 2007).*
Fault Isolation during Semiconductor Manufacturing using Automated Discovery from Wafer Tracking Databases Sharad Saxena (May 3, 1993).*
An intelligent production workflow mining system for continual quality enhancement G.T.S. Ho, H.C.W. Lau, C.K.M. Lee, A. W.H. Ip & K.F. Pun (Jun. 22, 2005).*
Use of Neural Networks in Modeling Semiconductor Manufacturing Processes: An Example for Plasma Etch Modeling Edward A. Rietman & Earl R. Lory (Nov. 1993).*
Hybrid data mining approach for pattern extraction from wafer bin map to improve yield in semiconductor manufacturing Shao-Chung Hsu, Chen-Fu Chien (May 2007).*
Manufacturing Integration of Data Collection and Statistical Process Control Systems Mike Clayton, Jim Durham, Steve Felker, Gene Fortner, Jim Martinez, & Steve Shelton (Dec. 9, 1997).*

* cited by examiner

*Primary Examiner* — Khanh Pham
*Assistant Examiner* — Bruce Witzenburg
(74) *Attorney, Agent, or Firm* — Blakely, Sokoloff, Taylor & Zafman, LLP

(57) ABSTRACT

Described herein are methods and systems for providing corrective maintenance using global knowledge sharing. A method to provide corrective maintenance with a CM system includes performing a query to generate a ranking of fixable causes based on factors (e.g., symptoms, configuration, test). The ranking may be determined based on a fixable cause percent match with the factors. The ranking of fixable causes may be associated with one or more solutions for each fixable cause. The ranking can be updated based on performing tests or solutions.

20 Claims, 14 Drawing Sheets

FIG. 6

| Causes | PCT of Matches | Factor 1 | Factor 2 | Factor 3 | Factor 4 | Factor 5 | Factor 6 | Factor 7 | Factor 8 | Factor 9 | Factor 10 |
|---|---|---|---|---|---|---|---|---|---|---|---|
| Cause 1 | 10% | 2 linked 20 | | | | 3 linked 30 | | | | | |
| Cause 2 | 9% | 1 linked | 2 linked 27 | | | | 2 linked 18 | 1 linked 10 | 1 linked 7 | | |
| Cause 3 | 7% | 2 linked | | | | | | | | | |
| Cause 4 | 5% | 3 linked 15 | 1 linked 5 | 1 linked 5 | 1 linked 5 | 1 linked 5 | | | 1 linked 5 | | |
| Cause 5 | 5% | 2 linked 10 | | | 1 linked 5 | 1 linked 5 | | | | | |
| Cause 6 | 4% | 1 linked 4 | | | | 1 linked 4 | | | | | 1 linked 4 |
| Cause 7 | 4% | | | | | | 1 linked 4 | 1 linked 3 | | 1 linked 4 | |
| Cause 8 | 3% | 2 linked 6 | 1 linked 3 | 1 linked 3 | 1 linked 3 | | 1 linked 3 | 3 linked 6 | | | |
| Cause 9 | 2% | 4 linked 8 | 3 linked 6 | 1 linked 2 | | 1 linked 2 | | | | 1 linked 2 | |
| Cause 10 | 1% | 2 linked 2 | 3 linked 6 | | 1 linked 1 | | 1 linked 1 | | | | 1 linked 1 |
| Next Best Factor All | | 88 | 49 | 44 | 41 | 41 | 30 | 22 | 22 | 15 | 12 |

Callouts:
- 600 → Factor
- "Indicates that this cause is linked to 3 factor values of this Factor"
- "This is the product of the Count of Matches and the number of links."
- "This is the highest ranked Factor because it has the highest total number of Next Best Factor number"
- "This is the highest ranked cause because it has the highest percentage match"
- "This number is the number of factor values in this Cause that matches the current query."

Search

Configuration | Symptoms | Tests | Solution | History

Navigate | Search | FAST

Symptoms: Etch 200mm Centura

- Symptoms
  - Wafer Effects
    - Wafer Damage
    - Particles
    - Etch Rate
    - Strip Rate
  - Observed Location
    - Mainframe

[Not Applicable] [Add Value]

Faults [search]

| FACTORY VALUE | SELECT |
|---|---|
| 0 : undefined event number ## subsystem XX param XX ### ## | ☐ |
| 1 : system constant file not found | ☐ |
| 2 : system constant file access error ## at location ## | ☐ |
| 3 : system constant file too small was ## records and should be ## records | ☐ |

[Next Last]

Selected Symptoms Factor Values:

No records to display

Not Applicable Symptoms:

No records to display

FIG. 7A

Search

Configuration | Symptoms | Tests | Solution | History

Navigate | Search | FAST
          722─┘    └─724

Symptoms Search: [Etch 200mm Centura ▼] [Search]

helium

Faults
Warnings
Traces

Selected Symptoms Factor Values:

| FACTOR | VALUE |
|---|---|
| Faults | 1218 : ch XX CHAMBER helium backside leak rate fault, limit is ## sccm, actual is ## sccm |

[Remove] ☐

Warnings                                    [Not Applicable] [Add Value]

helium  [search]                                              SELECT
FACTORY VALUE
1149: ch XX CHAMBER helium leak rate low, recommend check helium flow                        ☐
1319 : negative helium cooling flow( source XX), need to adjust helium mfc                    ☐
1572 : chamber XX CHAMBER detected helium leak warning condition                              ☐
1219 : ch XX CHAMBER helium backside leak rate warning, limit is ## sccm, actual is ## sccm   ☐

NextLast

Not Applicable Symptoms:

No records to display

Search

Configuration | Symptoms | Tests | Solution | History

Navigate | Search | FAST  ← 910

Factor Associated Structured Troubleshooter

Domain: [No Filter ▼]

| FIXABLE CAUSE | MATCH | TEST CHAMBER WAFER POSITION PUMPED DOWN | CHAMBER HE LEAK CHECK | CHAMBER LEAK RATE | CATHODE LIFT LEAK RATE TESTS | HELIUM LINE LEAK RATE |
|---|---|---|---|---|---|---|
| Electrostatic Chuck making poor contact with the HV pins | 33.33 % | 0 | 0 | 0 | 0 | 0 |
| ESC Orings Bad | 28.57 % | 0 | 0 | 0 | 0 | 0 |
| Sticking Helium Dump Valve | 28.57 % | 0 | 0 | 0 | 0 | 0 |
| Incorrect He MFM Settings | 28.57 % | 0 | 0 | 0 | 0 | 0 |
| Helium Supply Pressure Incorrectly Set | 28.57 % | 0 | 0 | 0 | 0 | 0 |
| Cathode base screws not tight enough | 25.00 % | 2 | 2 | 0 | 0 | 0 |
| Helium Filter Leaking | 25.00 % | 2 | 0 | 2 | 0 | 0 |
| Poor Helium MFM Grounding | 25.00 % | 0 | 0 | 2 | 0 | 0 |
| Leaking He Supply Stick | 22.22 % | 0 | 2 | 2 | 0 | 0 |
| Helium Flex Line Leaking | 22.22 % | 0 | 2 | 0 | 2 | 2 |
| Bent / Dirty Wafer Lift Pins | 20.00 % | 4 | 0 | 0 | 0 | 0 |
| Robot Speeds Too Fast | 20.00 % | 6 | 0 | 0 | 0 | 0 |
| HP Robot Bearings Worn | 20.00 % | 6 | 0 | 0 | 0 | 0 |
| VHP+ Robot Bearing Failure | 20.00 % | 6 | 0 | 0 | 0 | 0 |

FIG. 9

METHODS AND SYSTEMS FOR GLOBAL KNOWLEDGE SHARING TO PROVIDE CORRECTIVE MAINTENANCE

RELATED APPLICATION

This application claims the priority benefit of U.S. Provisional Patent Application No. 61/232,406, filed on Aug. 7, 2009 and entitled, "Global Knowledge Sharing Through Implementing Remote Service Technologies and Best Practice Networks," which is incorporated herein by reference.

TECHNICAL FIELD

Embodiments of the present invention relate to global knowledge sharing to provide corrective maintenance.

BACKGROUND

Many industries employ sophisticated manufacturing equipment that includes multiple sensors and controls, each of which may be carefully monitored during processing to ensure product quality. A "fault" can be a malfunction or maladjustment of manufacturing equipment (e.g., deviation of a machine's operating parameters from intended values), or an indication of a need for preventive maintenance to prevent an imminent malfunction or maladjustment. Faults can produce defects in the devices being manufactured. Correcting the faults can be a difficult procedure due to the numerous hardware and software configurations for the manufacturing equipment and the numerous process recipes used for manufacturing processes. Correcting the faults can also be time consuming and costly. The manufacturing equipment is also modified and upgraded by the user, which complicates corrective maintenance. Additionally, equipment availability is costly to the user and parts and labor are also expensive for the service contract.

BRIEF DESCRIPTION OF THE DRAWINGS

The present invention is illustrated by way of example, and not by way of limitation, in the figures of the accompanying drawings and in which:

FIG. 6 illustrates a FAST factor grid 600 in accordance with one embodiment;

FIGS. 7A-7C, 8, and 9 illustrate exemplary user interfaces for presenting a corrective maintenance search in accordance with certain embodiments;

DETAILED DESCRIPTION

Described herein are methods and systems for providing corrective maintenance using global knowledge sharing. In one embodiment, a method to provide corrective maintenance (CM) with a CM system includes performing a query to generate a ranking of fixable causes based on factors (e.g., symptoms, configuration, test). The ranking may be determined based on a fixable cause percent match with the factors. The ranking of fixable causes may be associated with one or more solutions for each fixable cause. The ranking can be updated based on performing tests or solutions.

The corrective maintenance (CM) system provides an advanced real-time remote support infrastructure that provides a remote support capability, maintenance technologies, global technical support, global knowledge network, and a structured escalation path. The global technical support may include product engineers that provide technical support and also field engineers that may be globally or regionally assigned to support equipment for a particularly customer. The CM system reduces rediscovery costs because troubleshooting costs only occur once, field experts contribute and validate solutions, and solutions are quickly made available on a global basis. The CM system reduces equipment repair costs because of continuous procedural improvements and continuous improvement strengthens the quality of corrective maintenance information that is globally available. The CM system also utilizes skilled resources (e.g., customer engineers, field engineers, product engineers, etc.) more effectively by boosting cross-trained engineering and having experienced engineers focus on difficult problems. The CM system also empowers end users to share troubleshooting solutions. The CM system may also be referred to as a best practices network (BPN) system.

The following description provides details of a corrective maintenance system that corrects maintenance issues associated with manufacturing devices. In one embodiment, the corrective maintenance system is for use in the manufacturing of electronic devices (e.g., semiconductors). Manufacturing such devices generally requires dozens of manufacturing steps involving different types of manufacturing processes. For example, etching, sputtering, and chemical vapor deposition are three different types of processes, each of which is performed on different types of machines. Alternatively, the corrective maintenance system may be used for maintenance in the manufacture of other products, such as automobiles. The manufacture of such other products may also require many different processing steps by various manufacturing machines.

Figure 1:
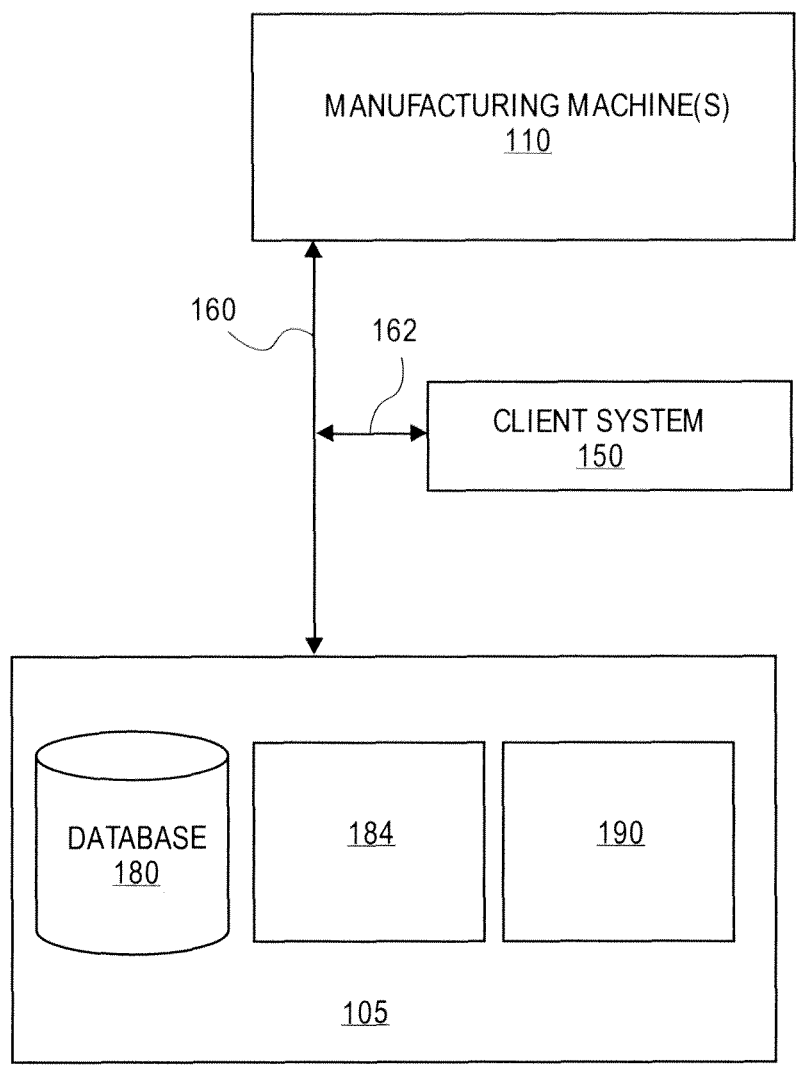
FIG. 1 illustrates one embodiment of a global knowledge sharing corrective maintenance system to provide corrective maintenance.

FIG. 1 illustrates one embodiment of a corrective maintenance system. The corrective maintenance system 105 couples with one or more manufacturing machines 110 and one or more client systems 150 by data communication links 160 and 162. The client system 150 can access the corrective maintenance system 105 with a browser. The client system 150 may be a computing device, computer, laptop, tablet, netbook, hand-held device, mobile device, etc. System 150 may be hosted by one or more machines such as a computer, a data processing system, a web appliance, a server, a network router, switch or bridge, data center, or any machine capable of executing a set of instructions (sequential or otherwise) that specify actions to be taken by that machine. The corrective maintenance system 105 includes a server side presentation module 190, an application container 184, and one or more databases 180. The databases 180 store application data including the user's data as well as site content data including web pages (e.g., ASPX). The databases 180 also include any additional data used in the corrective maintenance system 180. The application container 184 is a service and business domain that is responsible for translating the information between the user interface and data storage layer associated with databases 180.

In an embodiment, the corrective maintenance system generates different types of factors (e.g., symptoms, configuration, test) associated with a corrective maintenance event. A user can select one of these types of factors and the CM system performs a query to generate a ranking of fixable causes based on the selected type of factors. The ranking of fixable causes may be associated with one or more solutions for each fixable cause. A user can then intelligently select a solution to quickly fix the CM event.

In one embodiment, each of the manufacturing machines 110 is a machine for the manufacture of electronic devices, such as etchers, chemical vapor deposition (CVD) furnaces, photolithography devices, implanters, etc. Alternatively, the manufacturing machines 110 may be of a type for manufacturing other products (e.g., automobiles). In one embodiment, each of the manufacturing machines 110 is of a single type. Alternatively, the manufacturing machines 110 may include multiple different types of equipment, each of which may run different processes.

Data communication links 160 may include conventional communication links, and may be wired or wireless. The corrective maintenance system 105 may include one or more servers and/or computers. The databases 180 store raw data and other types of data that may originate from the manufacturing machine(s). In one embodiment, the databases 180 are a single storage device of a computer or server of the corrective maintenance system 105. Alternatively, the databases 180 may be external to the corrective maintenance system 105. In one embodiment, the databases 180 include multiple storage devices, some of which may include redundant copies of data for backup.

Figure 2:
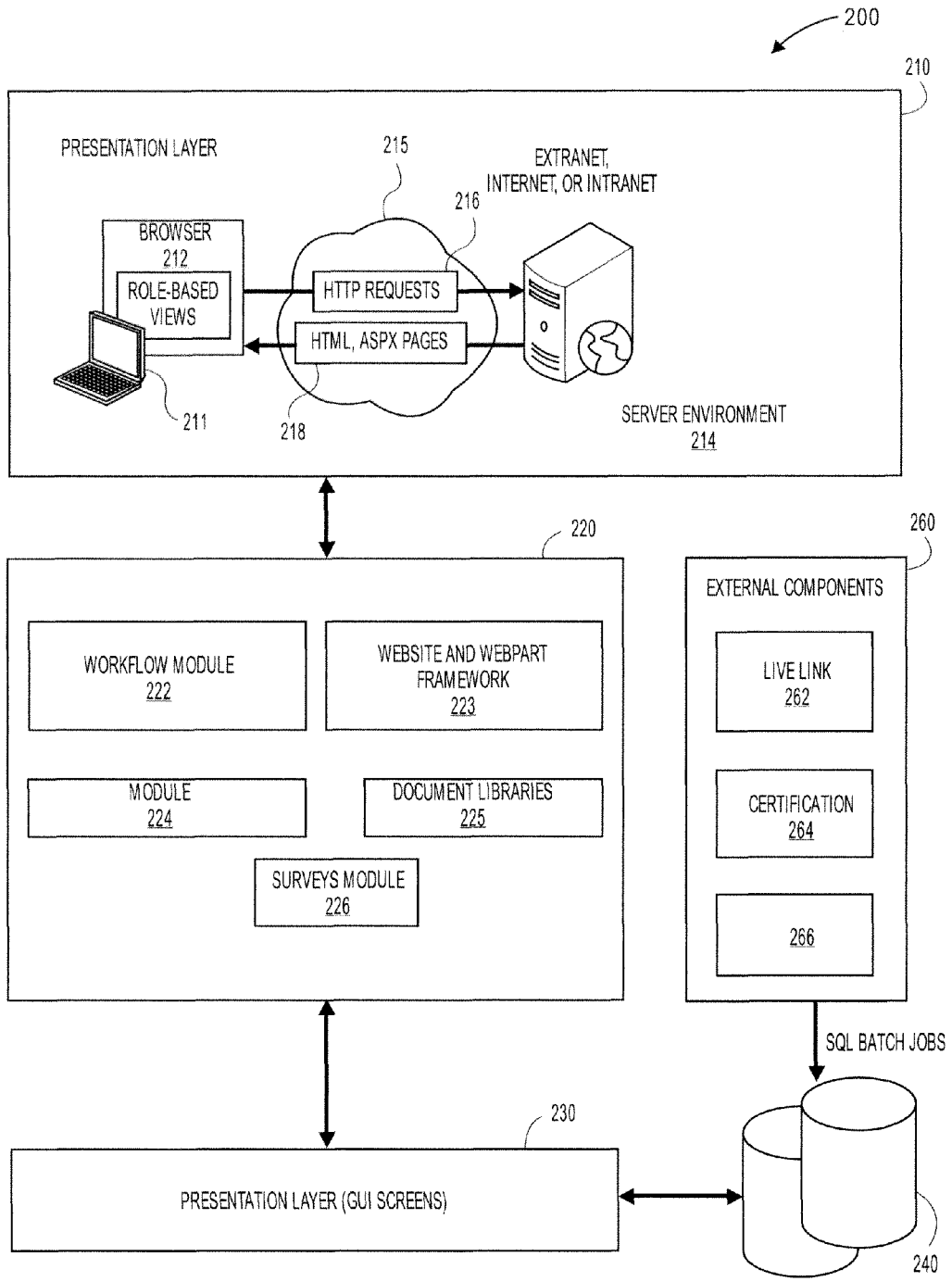
FIG. 2 illustrates another embodiment of a corrective maintenance system.

FIG. 2 illustrates another embodiment of a corrective maintenance system. The corrective maintenance (CM) system 200 includes a presentation layer 210. The presentation layer 210 is implemented with a client system 211 having a browser 212 and a server environment 214. The browser 212 provides a user (e.g., customer engineer, field engineer, customer support engineer) with role-based views for the corrective maintenance procedure. The communication network 215 couples the client system 211 and the server environment 214. The client system 211 may send a HTTP request via the network 215 to the server environment 214, which responds with content (e.g., HTML, ASPX pages). The presentation layer 210 communicates with the service and business layer 220, which includes a workflow engine module 222, a website and webpart framework 223, a custom application pages module 224, a document libraries 225, and a surveys module 226. The workflow module 222 provides a rich programming model for building the semantics of processes in terms of activities into an application. The set of activities that coordinate people and software workflow provides a way for organizing activities into a workflow with additional support for program control flow, transactions, synchronization, exception handling and interactions with other applications. Furthermore, it provides a set of services for advanced workflow management, including workflow persistence, compensating transaction, activity tracking, runtime tracing etc. In an embodiment, all of these services are controlled by the workflow runtime, which can be hosted in any CLR application domains and can be embedded into any .NET applications. The workflow module 222 enables global knowledge sharing of maintenance issues to expedite the corrective maintenance procedure.

The custom application pages module 224 provides custom application pages to create the web user interface as required for business functionality. The document libraries 225 are used as a document repository system for CM applications. The corrective maintenance (CM) presentation layer 230 interfaces between the layer 220 and the database 240 to provide graphical user interface screens. External components 260 may include live link 262, certification 264, and a service order ticketing system 266. The service order ticketing system 266 is a system for tracking and storing a service or maintenance request.

Figure 3:
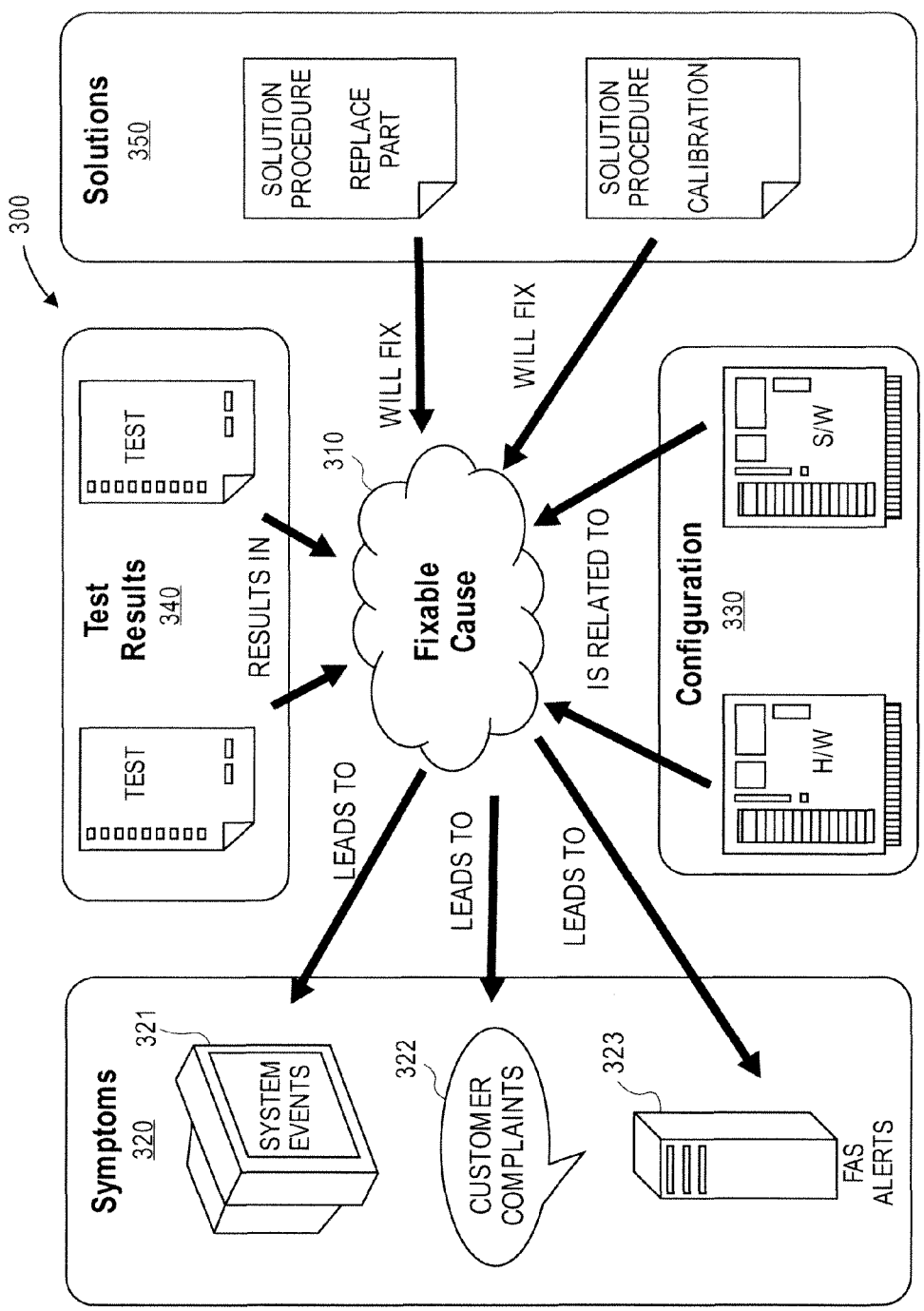
FIG. 3 illustrates relationships between data processed by the CM system in accordance with some embodiments.

FIG. 3 illustrates relationships between data processed by the CM system in accordance with some embodiments. Major categories of data processed by the CM system include symptoms 320, configuration 330, test results 340, and solutions 350. A fixable cause 310 (e.g., generator incorrectly setup, electrostatic chuck (ESC) making poor contact with HV pins, etc.) leads to symptoms 320 (e.g., system events 321, customer complaints 322, FAS alerts 322, etc.). The fixable cause may be related to hardware and/or software configuration 330. A customer engineer diagnoses the symptoms and provides symptom data to the CM system. The CM system can rank potential solutions 350 based on the symptoms 320. The customer engineer can select a potential solution or can choose to implement a test procedure and provide test results to the CM system prior to selecting a potential solution. In this case, the CM system uses results from the test procedure to rerank the potential solutions. Solutions procedures may include replacing a part or performing a calibration for a component of the manufacturing equipment.

Figure 4:
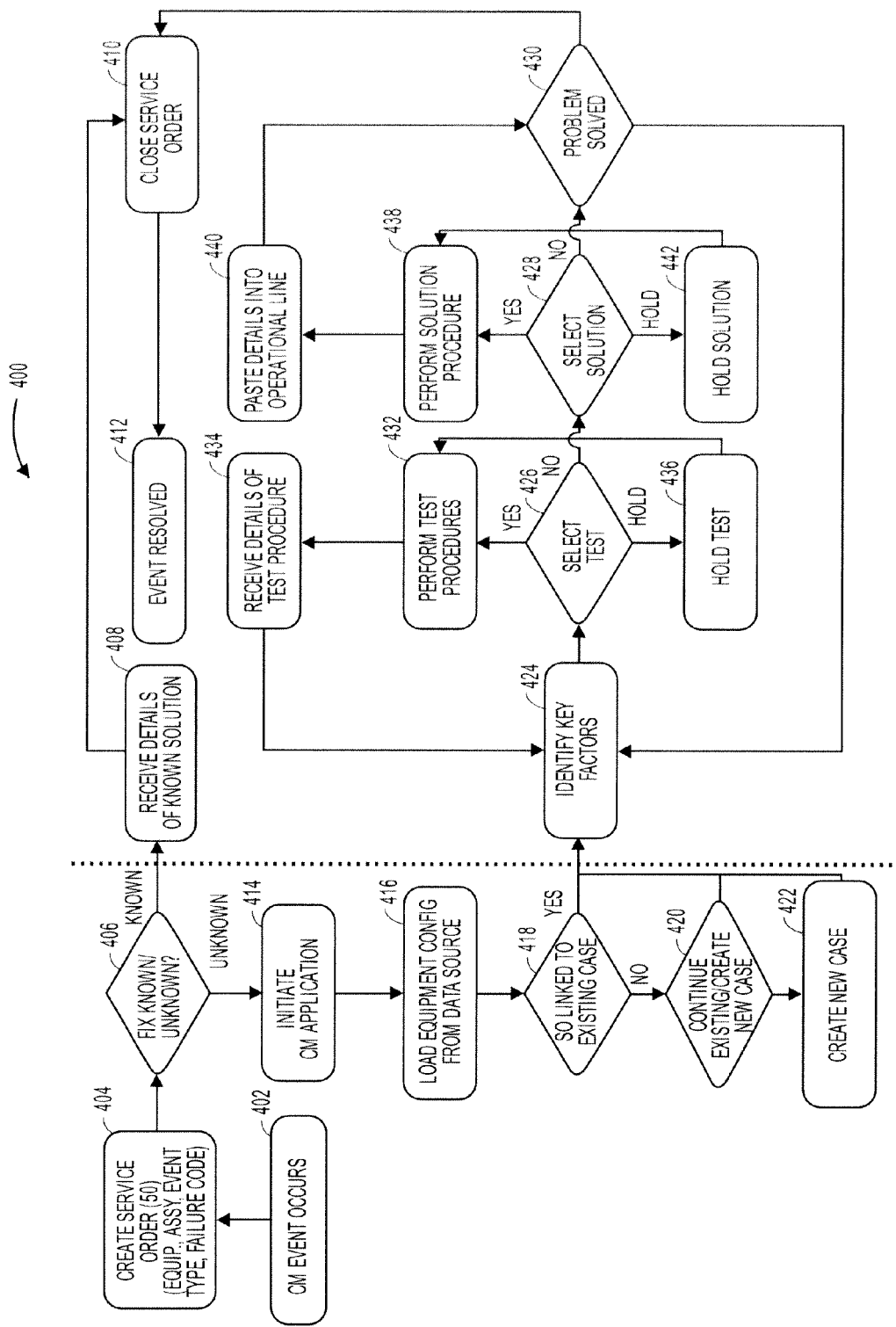
FIG. 4 illustrates a flow diagram of one embodiment for a method 400 of providing corrective maintenance.

FIG. 4 illustrates a flow diagram of one embodiment for a method 400 of providing corrective maintenance. The method may be performed by processing logic that may comprise hardware (e.g., circuitry, dedicated logic, programmable logic, microcode, etc.), software (such as instructions run on a processing device), or a combination thereof. In one embodiment, the method is performed by the corrective maintenance system 105 or 200 and/or service order system 266.

Referring to FIG. 4, the method begins with the occurrence of a CM event (e.g., fault, equipment malfunction, etc.) at block 402. The method further includes receiving a service order with a service order system at block 404. The service order system creates the service order based on data provided by a user (e.g., customer engineer). The service order may include, for example, equipment type, assembly, event type, failure code, etc. The processing logic of the service order system determines whether the consumer engineer knows how to fix the CM event or whether the solution is unknown at block 406. If the solution is known, then the service order system receives details for the fix from the consumer engineer at block 408. The consumer engineer may enter these details into an operation line of the service order system. In this case, the service is closed in the service order system at block 410 and the event is resolved at block 412.

If the solution is unknown, the service order system can initiate a CM application in response to user input at block 414. The processing logic of the CM system loads equipment configuration information from a data source (e.g., database, service order system) at block 416. The processing logic of the CM system determines whether the service order is linked to an existing case at block 418. If so, then the processing logic of the CM system identifies key factors at block 424. If not, then the processing logic of the CM system determines whether the user wants to create a new case or continue using an existing case at block 420. The flow proceeds to block 424 if the user wants to continue with an existing case. The CM system creates a new case with user input (e.g., selected domains, equipment configuration) or information available to the system at block 422. The flow proceeds to block 424 if the user wants to create a new case.

Factors are attributes of a problem, which make the problem unique. Configuration factors describe the physical equipment options and include hardware options, software options, and environmental factors. Symptom factors describe the symptom of the problem. Symptom factors may include substrate or wafer effects, system software faults/warnings/events, observations, etc. Test factors describe the results of performing a test. For example, test factors may include process tests, vacuum tests, macro tests.

At block 424, the CM system may identify key factors based on symptoms, domains, equipment configuration, etc. The symptoms, domains, equipment configuration may be received from the user and stored within the CM system or service order system. One embodiment of identifying key factors using a search query is explained in more detail below in conjunction with the description of FIG. 5. The search query may generate a ranking of fixable causes based on the identification of key factors.

Returning to FIG. 4, the processing logic of the CM system determines whether the user selects a test at block 426. If so, then the test procedure is performed by the user at block 432. The CM system receives details of the performed test procedure at block 434 and the flow returns to block 424. The CM system can update a ranking of fixable causes based on test details from the completed test procedure at block 425. The test may be placed on hold at block 436 and later performed at block 432.

If no test is selected, then the CM system determines whether the user selects a solution associated with one of the fixable causes at block 428. If so, then the solution procedure is performed at block 438. The CM system receives details from the user of the performed solution procedure at block 440 and the flow continues to block 430. The CM system can determine whether the problem is solved at block 430 based on user input. The flow continues to blocks 410 and 412 if the solution corrects the problem associated with the CM event at block 430. Otherwise, if the complete solution does not solve the problem, then the flow returns to block 424 and the CM system can update a ranking of fixable causes based on solution details from the completed solution procedure.

Returning to block 428 and the selection of a solution, the solution may be placed on hold at block 442 and later performed at block 438. Alternatively, if no suitable solution is provided by the CM system at block 428, then the user can use an escalation path to solve the problem. The escalation path may include contacting a specialist to solve the problem.

Figure 5:
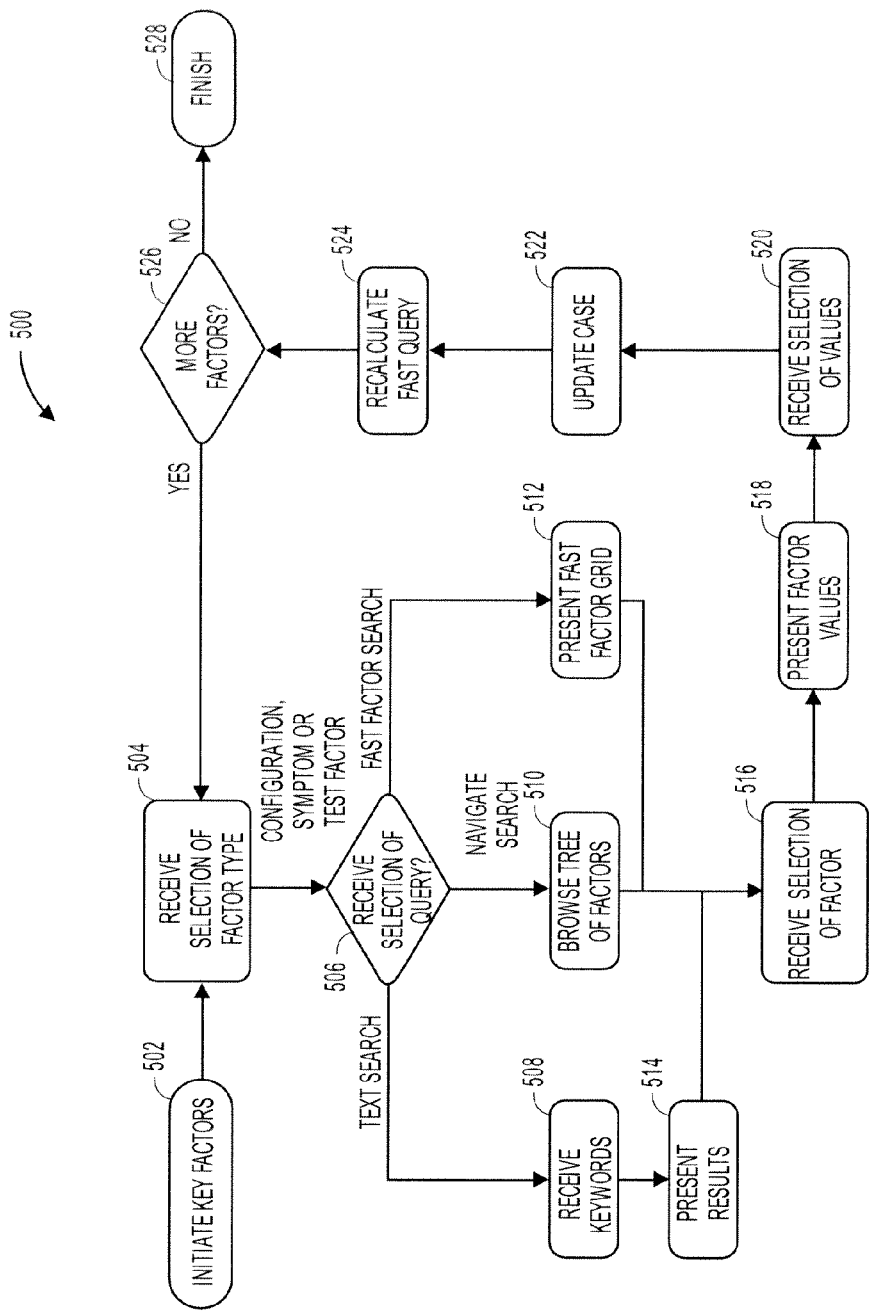
FIG. 5 illustrates a flow diagram of one embodiment for a method 400 of identifying key factors.

FIG. 5 illustrates a flow diagram of one embodiment for a method 400 of identifying key factors. The method may be performed by processing logic that may comprise hardware (e.g., circuitry, dedicated logic, programmable logic, microcode, etc.), software (such as instructions run on a processing device), or a combination thereof. In one embodiment, the method is performed by the corrective maintenance system 105 or 200.

Referring to FIG. 5, the method begins with initiation of identification of key factors at block 502. The method further includes receiving a selection of a factor type (e.g., symptom, configuration, test) at block 504. The processing logic receives a selection of a search query type (e.g., text search, navigate search, FAST factor search) at block 506. If a text search is selected, then the processing logic receives text (e.g., keywords) as the terms of search from the user at block 508. The processing logic presents the results of the search query to the user at block 514. Alternatively, if a navigate search is selected, then the user browses a hierarchy of factors presented by the processing logic at block 510. In another embodiment, the FAST factor search is selected at block 506 and the processing logic presents a FAST factor grid as will be described in more detail below in conjunction with the description of FIG. 6.

The processing logic receives a selection of a factor at block 516. The processing logic presents factor values to the user at block 518. For example, if a configuration factor is "software version," then exemplary factor values may be 1.0, 1.1, 1.2, etc. If a symptom factor is "particle pattern," then exemplary factor values may be solid, striped, star, radial, or linear. If a test factor is "verify voltage present at Pin 1," then exemplary factor values may be Pass if a voltage is present at Pin 1 or Fail if no voltage or low voltage is present at Pin 1.

The processing logic receives a selection of factor values at block 520. The processing logic updates the case based on the previous user selections at block 522. The processing logic recalculates the FAST query at block 524. The processing logic determines whether more factors needs to be analyzed at block 526 based on user input. The flow proceeds to block 528 to finish the identification of the key factors.

FIG. 6 illustrates a FAST factor grid 600 in accordance with one embodiment. The grid 600 includes columns of fixable causes, percentage matches, and factors (e.g., symptoms, configuration, test). The CM system calculates the percentage matches by performing the FAST factor query on a database and determining for each fixable cause a number of factors that match the query. For example, the user may enter a single symptom factor. The CM system searches the database for every fixable cause that has a factor which matches the query (e.g., symptom factor). The total number of matching factors for each fixable cause is then divided by a total number of factors for that fixable cause to generate the fixable cause percent match (e.g., 10%, 9%, 7%). In an embodiment, the fixable causes are ranked based on the percent match with the top 100 being presented to the user.

The factors are ranked based on determining the next best factor value (e.g., 88, 49). For each fixable cause and for each matching factor that is not in the query, the CM system multiplies a number of factor values for the fixable cause by the percent of match. For example, factor 1 of cause 3 has 3 linked factor values. The number 3 is multiplied by 5% to generate a factor value of 15 for factor 1 and cause 3. These factor values are summed to generate the next best factor values (e.g., 88 for factor 1), which provides a ranking for the factors. In this example, factor 1 has the highest ranking (e.g., 88).

Figure 7C:
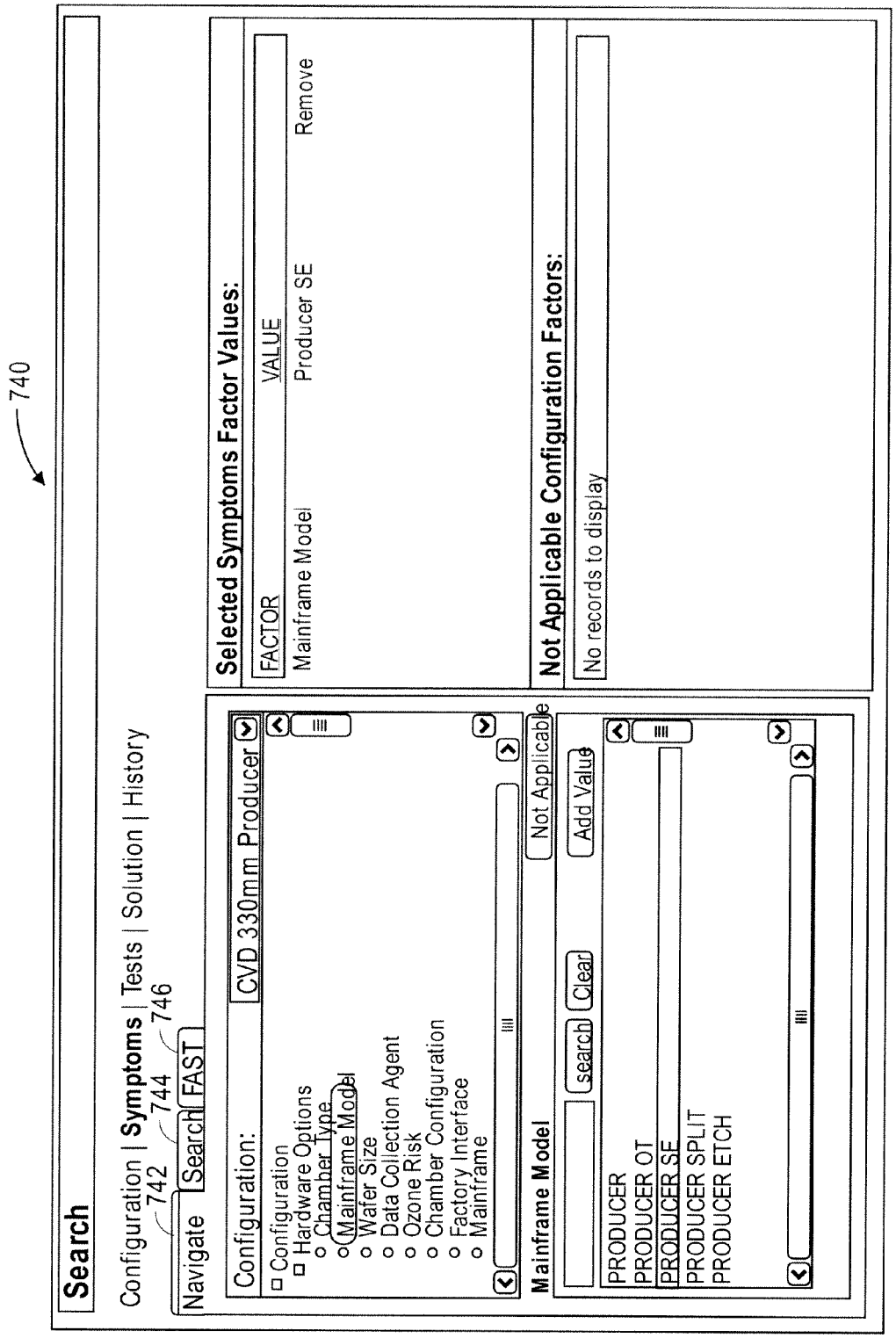

FIGS. 7A-7C, 8, and 9 illustrate exemplary user interfaces for presenting a corrective maintenance search in accordance with certain embodiments. User interface 700 shown in FIG. 7A is a symptom screen for selecting the symptom 710 based on the user problem indicator (software fault, wafer effects, observed, etc.). The Navigate tab 702 allows the user to search for the factor value with a tree view. The Search tab 704 allows the user to enter keywords to search for factor names and factor values. The factor associated structured troubleshooting (FAST) tab 706 allows the user to identify the next best factor value to choose based on the values already selected. If multiple domains have been chosen, then the user may filter by domain from the domain drop-down menu 708.

User interface 720 shown in FIG. 7B is a symptom screen for performing a symptoms text search 722. The Search tab 722 allows the user to enter keywords (e.g., helium) to search for factor names and factor values.

The user interface 740 shown in FIG. 7C is a configuration screen provided to enter configuration options. The Navigate tab 742 allows the user to search for the factor value with the hierarchical tree view. The Search tab 744 allows the user to enter keywords to search for factor names and factor values. The FAST tab 746 allows the user to identify the next best factor value to choose based on the values already selected.

Figure 8:
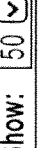

User interface 800 shown in FIG. 8 is a solution screen. A user selects Solution at the top of the screen and the CM system generates a list of recommended solutions 820 associated with the top fixable causes. In an embodiment, the CM system has created a list of probable causes that matches at least one of the symptoms previously selected by the user.

The causes are ranked based on how many of the factor values match the factor values the user has selected. The recommended solutions section displays the following information:

Cause 810—Select the title to see more details about the cause;

Solution 820—Select the title to see more details about the solution;

Use 830—This column shows the number of times the procedure has been successfully used to help solve a problem;

Labor 840—Shows the time (e.g., man hours) it takes to perform the solution procedure;

Task 850—Shows the total recovery time;

Level 860—Shows the procedure capability level;

Reqs 870—This column links to the parts and special equipment required for this procedure;

Hold—Removes the solution procedures from the current list and puts it on the History screen where it can be tried at a later time; and Perform—Try the solution procedure and record the results.

The solution procedure can be removed from the current list and the results will be updated on the History screen. The FAST function in configuration options, symptoms, or test procedures will identify the next factor to check and will rank them (from left to right) based on the number of factor values that are linked to the probable causes.

User Interface 900 shown in FIG. 9 is a FAST screen that is created by selecting tests from the user interface 900. Next, the user selects the FAST tab 910. Each row of the FAST factor search view represents a probable cause. Each column represents a factor that has not yet been checked, but would provide more information about which cause is most likely. Then, the user selects the first test by selecting the title of the test.

Creating a solution requires linking factor values from the configuration options, symptoms, and test module to the cause and associated solution procedure. When creating a CM solution, the user should specify the following information:

Configuration options (required)
   Configurable information that is specific to the cause and solution
   Example—Chamber type: PECVD DxZ
Symptoms (required)
   The indication that there is an issue with the tool
   Example—Software fault: Event ID XX: RF Power Fault
Test procedure and results (optional)
   The critical test procedures and results that can help identify the cause of the problem
   Examples:
   Test: Check RF power output at generator
   Result: Failed, no power
Fixable cause (required)
   The reason why a symptom occurred in the first place
   Example: Bad generator
Solution procedure (required)
   The procedure used to fix the cause
   Example: Replace generator (part number xxxx-xxxxx)

Figure 10:
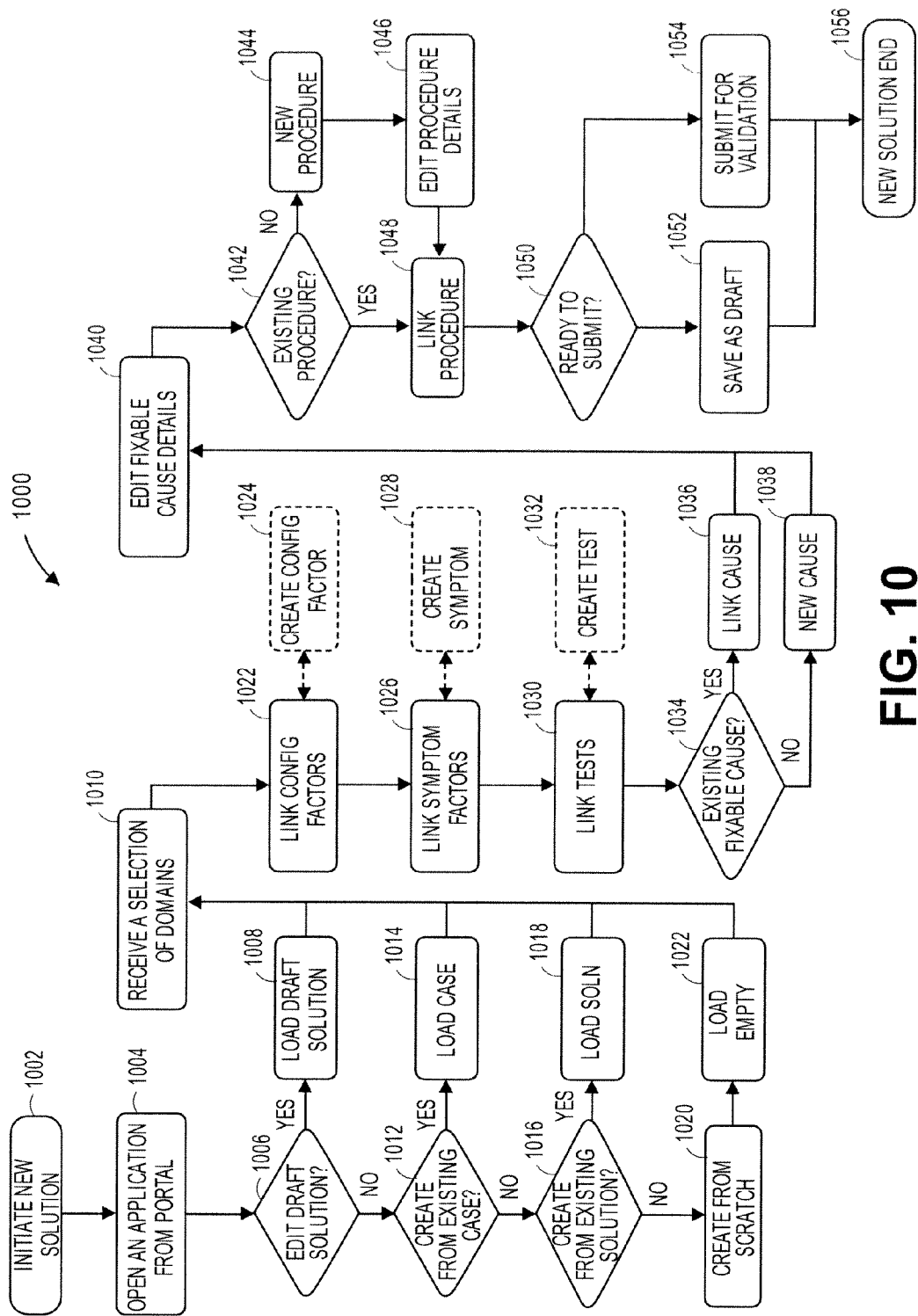
FIG. 10 illustrates a flow diagram of one embodiment for a method 1000 of solution creation.

FIG. 10 illustrates a flow diagram of one embodiment for a method 1000 of solution creation. The method may be performed by processing logic that may comprise hardware (e.g., circuitry, dedicated logic, programmable logic, microcode, etc.), software (such as instructions run on a processing device), or a combination thereof. In one embodiment, the method is performed by the corrective maintenance system 105 or 200 and/or service order system 266.

Referring to FIG. 10, the method begins with initiation of a new solution (i.e., user decides to create a new solution) at block 1002. The method further includes opening a CM application from a portal (e.g., service order system portal). The processing logic of the CM system determines whether the user (e.g., consumer engineer) wants to edit a draft solution at block 1006. If so, then the CM system loads the draft solution at block 1008. The consumer engineer may then select domains (e.g., equipment type) at block 1010.

If a draft solution is not edited, then the processing logic of the CM system determines whether a new solution is being created from an existing case at block 1014. If so, then the processing logic of the CM system loads the existing case at block 1014 and the flow proceeds to block 1010. If not, then the processing logic of the CM system determines whether the user wants to create a new solution by editing an existing solution at block 1016. If so, then CM system loads the existing solution at block 1018 and the flow proceeds to block 1010. If the new solution is not being created from an existing solution, then the CM system creates a new draft solution from a blank template at block 1020 and the flow proceeds to block 1010.

After selection of the domains, the CM system links configuration factors at block 1022 and optionally creates configuration factors at block 1024. For example, to link a configuration factor to a fixable cause, a use can go to the Configuration Factors screen, choose the available factors by selecting the Navigate or Search tab. If the Search tab is used, the user can enter a keyword to search for. After an available factor is selected, its factor values are displayed in the factor values section of the screen.

To link the configuration factor to the fixable cause, a user can select all of the appropriate factor values and select the Add Value button. The selected factors are now linked and displayed in the Selected Factors section of the screen. A user can select the Next button to continue to the Symptoms screen.

To create new factors and factor values, the user can select a category in which to store it. Then the user can select the New Factor button.

On a Create Configuration Factor screen, the user can enter a factor title in the Name field and a factor description in the Description field.

To add values to the factor, the user can select the New link in the Factor Values section. A new row is added to the list.
 a. Enter a name for the factor value.
 b. Enter a description for the factor value (optional).
 c. Select the Update link to save the factor value.

After adding values to the factor, select the Save button to close the Create Configuration Factor screen and return to the Configuration Factors screen.

Then the user can select the Remove link to remove any values that do not apply to the fixable cause. Creating a new factor automatically links all of its values to the fixable cause. In one embodiment, it is important that the user remove the values that are not applicable to this specific troubleshooting solution. Removing the values may not delete them from the application, but may only delete them from this new fixable cause. After creating the configuration factors, the user may select the Next button to continue to the Symptoms screen.

Next, the CM system links symptom factors at block 1026 and optionally creates symptom factors at block 1028. The linking and creating of symptom factors occurs in a similar manner as described above for linking and creating configuration factors.

Then, the CM system links test factors at block 1030 and optionally creates test factors at block 1032. The linking and creating of test factors occurs in a similar manner as described above for linking and creating configuration factors. The difference between test factors and other types of factors is that each test requires actions. Generally, tests are actions taken as part of the troubleshooting process to identify the fixable cause.

To link a test factor to a fixable cause, the user can go to the Tests section and selects the available factors by using the Navigate or Search tabs.

After an available factor is selected, its factor values can be displayed in the FACTOR VALUE section of a Tests screen.

If a factor value is not found under an existing factor, then the user may need to have the new factor value added to the factor. To link the test factors to the fixable cause, the user may select all of the appropriate factor values.

Then, the user may select the Add Value button. The selected factors are now linked and displayed in the Selected Tests section of the screen. After linking the test results factors, the user may select the Next button to continue to the Create Test Factor screen.

To create a new test factor, the user may enter the title of the test factor in the Title field. The user may select an applicable procedure type from the Procedure Type drop-down menu. The user may select a capability level from the Capability Level drop-down menu. The capability level indicates the expected level of understanding that another engineer would need to use this procedure. It also dictates whether a detailed procedure (Microsoft Word or Adobe PDF) is required to create the test procedure. In one embodiment, the capability level does not prohibit user access to the procedure, but only indicates the maturity level of the procedure and its intended audience.

The user may enter the number of engineers needed to perform the procedure in the Min Number of FSE's field. Then, the user may enter the number of hours in the Estimated Labor Hours field. Labor hours refers to the direct hours it takes to perform the test procedure. The user may enter the length of the procedure in the Estimated Task Duration field. Task duration refers to the total recovery time after a test procedure is performed. The user may use the Results, Part Information, Special Equipment, and Restrictions tabs to add more information to the test factor.

Test results are the possible outcomes of performing the test. In one embodiment, the user should include all possible results (such as pass or fail) so those performing the procedure can indicate that outcome.

The user can select the Remove link to remove the values that do not apply to the fixable cause. Creating a new factor automatically links all of its values to the fixable cause. It is important that the user remove the values that are not applicable to this specific troubleshooting solution. In one embodiment, removing the values does not delete them from the application, but only deletes them from the new factor.

At block 1034, the CM system determines whether an existing fixable cause exists that matches the user's selected factors. If so, then the cause is linked to the selected factors at block 1036. If none of the existing causes apply to the problem, then a new cause is created at block 1038. The flow proceeds to block 1040 where the user can edit fixable cause details (e.g., title, description for the cause, failed part number or any parts that led to the failure in the failed part fields).

At block 1042, a Select Procedures screen may display a list of the procedures linked to a cause and a list of procedures that may apply to the cause. An existing procedure can be linked to the cause at block 1048. If no existing procedure is available at block 1042, then a new procedure can be created at block 1044. Procedure details are edited at block 1046. The CM system determines whether the user is ready to submit the new solution at block 1050. The solution is saved at block 1052 and submitted for validation at block 1054. The solution creation process ends at block 1056.

In one embodiment, when a CM solution is submitted by its author, it goes into the validation queue for the domains that were selected. Validators for that domain periodically check the queue for new solutions. When a validator clicks on a solution, it is removed from the queue and is assigned to him or her. The solution can be checked back into the queue at any time. The validator reviews the fixable cause, the symptoms, the configuration options, any test procedures, and the solution procedure. If any one part is unsatisfactory, the entire submission is returned to the author with comments. If all of the submission is satisfactory, the solution is approved and made publicly available.

In one embodiment, the validator has access to a Validations tab in the CM home page (e.g., My BPN) for the domains he or she is assigned to. In one embodiment, only solutions submitted to those domains will be visible in the queue. The validator can filter the queue by any one of those domains with the drop-down filter in the upper right side of the screen. Each submitted solution includes basic information such as the title, submission date, and the author's name.

Figure 11:
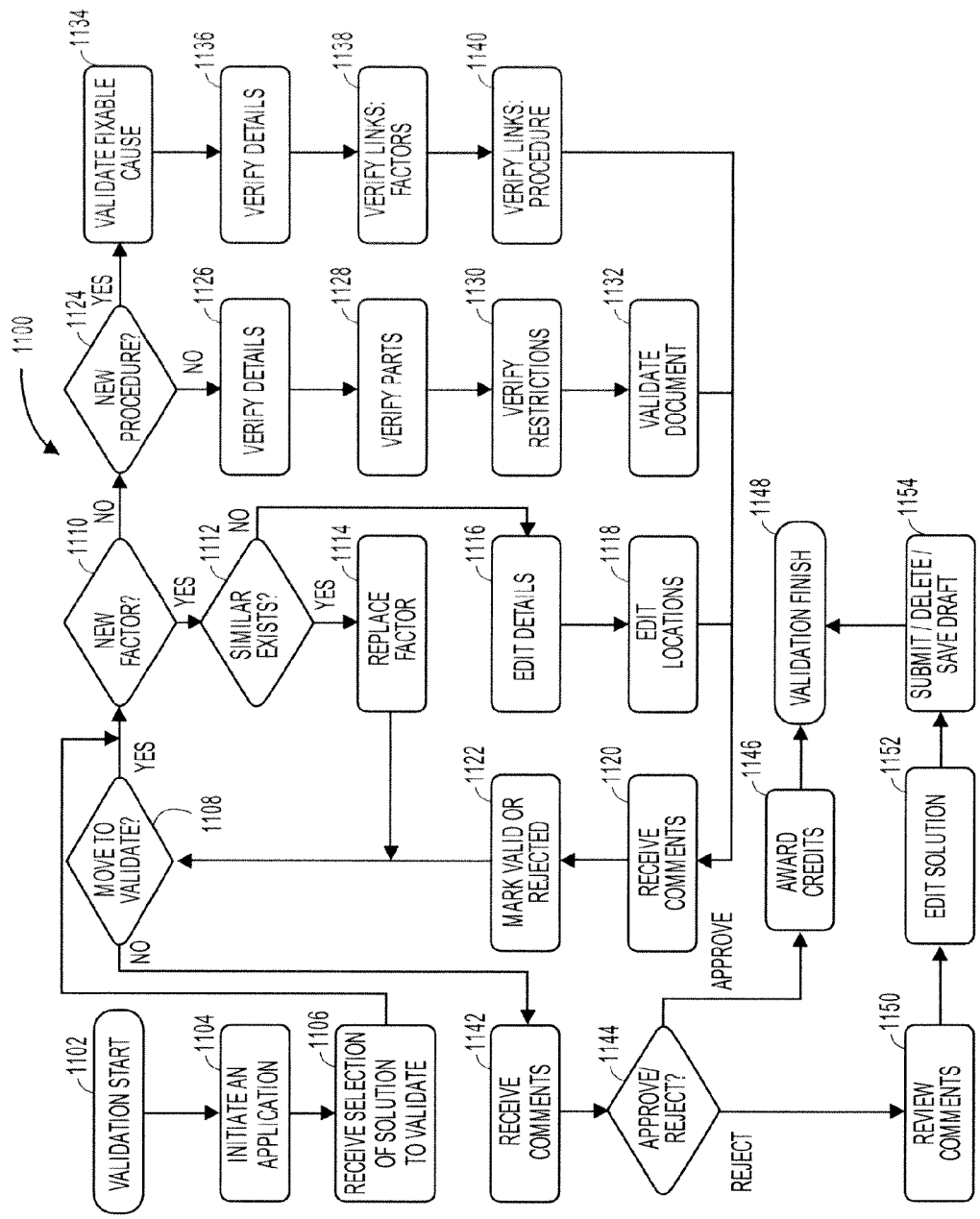
FIG. 11 illustrates a flow diagram of one embodiment for a method 1100 of validating a solution.

FIG. 11 illustrates a flow diagram of one embodiment for a method 1100 of validating a solution. The method may be performed by processing logic that may comprise hardware (e.g., circuitry, dedicated logic, programmable logic, microcode, etc.), software (such as instructions run on a processing device), or a combination thereof. In one embodiment, the method is performed by processing logic of a validation system or the CM system.

Referring to FIG. 11, the method begins with initiation of validation at block 1102. The method further includes opening a CM application from a portal (e.g., service order system portal). The processing logic receives a selection of a solution to validate from the user (e.g., validator) at block 1106. Then, the processing logic determines whether the solution includes a new factor at block 1110. If so, then the processing logic determines whether a similar factor in comparison to the new factor exists at block 1112. The new factor is replaced with a similar factor at block 1114 if the similar factor exists. The processing logic then determines whether any more solutions need to be validated at block 1108.

If a similar factor does not exist at block 1112, then the details of the new factor are edited at block 1116 and locations are edited at block 1118. The processing logic receives comments from the validator at block 1120 and receives an indication of the solution being marked as valid or rejected at block 1122. The flow continues to block 1108.

Returning to block 1112, if no similar factor exists, then the flow proceeds to blocks 1116-1122. Returning to block 1110, if the solution does not include a new factor, then the processing logic determines whether the solution includes a new procedure at block 1124. If not, then the processing logic with the validator verifies details of the solution at block 1126, verifies parts of the solution at block 1128, verifies restrictions of the solution at block 1130, and validates the solution document at block 1132. The flow continues to blocks 1120, 1122, and 1108.

If the solution does include a new procedure at block 1124, then the processing logic validates a fixable cause associated with the new procedure at block 1136, verifies details of the new procedure at block 1136, verifies links associated with the factors at block 1138, and verifies links associated with the new procedure at block 1134. The flow continues to blocks 1120, 1122, and 1108.

Returning to block 1108, if no more solutions needs to be validated, then the processing logic receives comments from the validator at block 1142. The validator indicates to the processing logic whether the solution is in approved or rejected at block 1144. The validator can award credits to the author (e.g., customer engineer) at block 1146 for created a new solution. Validation of the new solution finishes at block 1148.

If the solution is rejected at block 1144, then the author can review the comments provided by the processing logic at block 1150, edit the solution at block 1152, and then submit, delete, or a save a revised solution at block 1154. Validation of the new solution finishes at block 1148.

If a draft solution is not edited, then the processing logic determines whether solution is being created from an existing case at block 1014. If so, then the processing logic loads the existing case at block 1014 and the flow proceeds to block 1010. If not, then the processing logic determines whether the user wants to create a new solution from an existing solution at block 1016. If so, then processing logic loads the existing solution at block 1018 and the flow proceeds to block 1010. If the new solution is not being created from an existing solution, then the processing logic creates a new draft solution from a blank template at block 1020 and the flow proceeds to block 1010.

Prior approaches for corrective maintenance have failed to support complex hardware configurations, failed to allow end users to make decision about next operations, failed to give end users visualization of the next steps, failed to utilizing end-users to author new solutions, failed to allow for distributed validation model, failed to allow end users to comment/revise existing content, and failed to allow content to be restricted based on customer The CM system provides an infrastructure that addresses the above short comings of the prior approaches. Maintenance issues are indexed by their symptoms. Test procedures are used to help diagnose configuration options and identify the potential problems. Any user can create or revise solutions. A large validator community reduces publishing time of a new solution. Validation occurs for safety, customer intellectual property, avoiding duplication, and ensuring maturity of the solution. The quality of a new solution can be measured by number of uses and user comments. The CM system is also integrated with the service order tracking system to further expedite the corrective maintenance procedure. Troubleshooting knowledge can easily be shared between different shifts of personnel.

Figure 12:
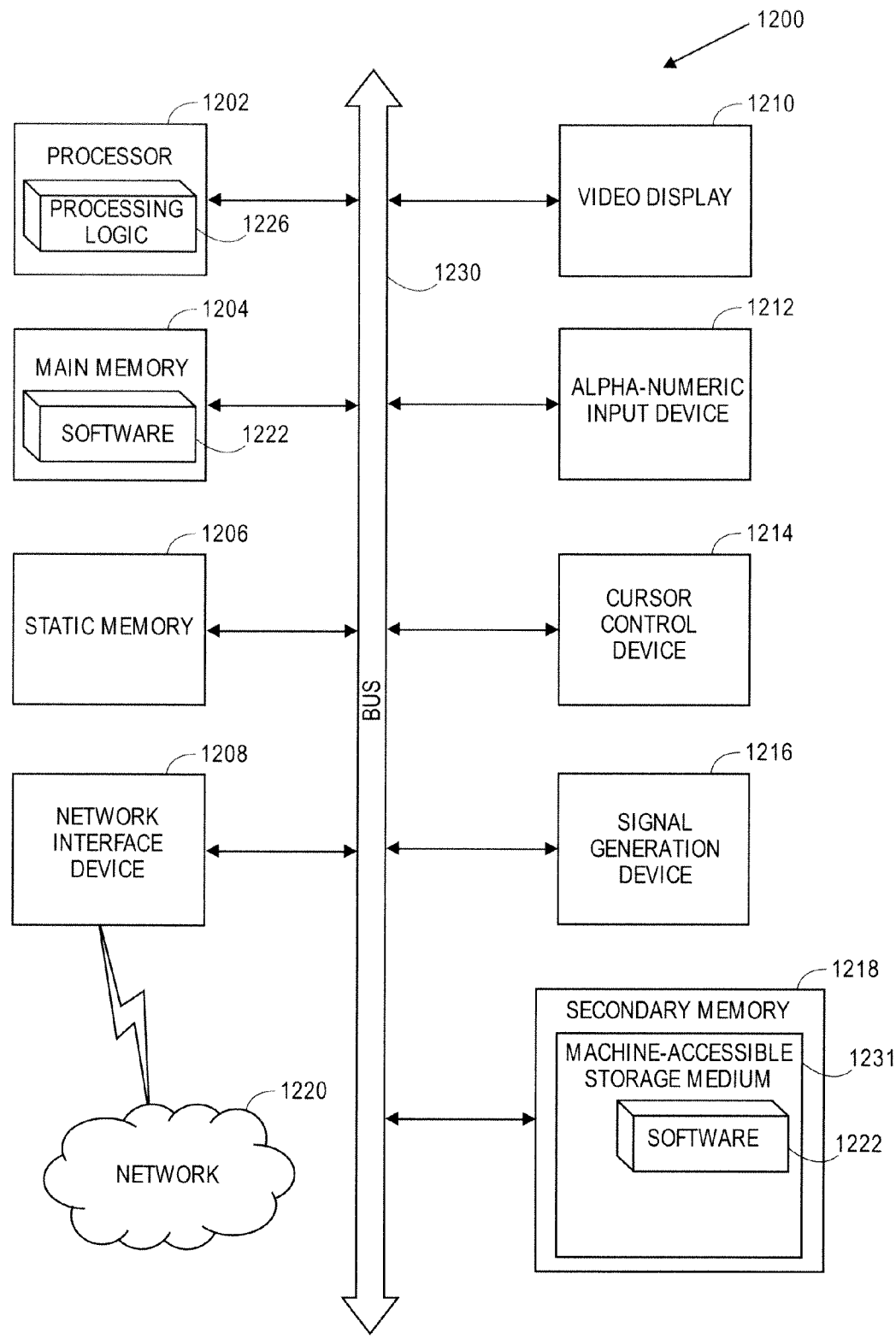
FIG. 12 illustrates a diagrammatic representation of a machine in the exemplary form of a computer system within which a set of instructions, for causing the machine to perform any one or more of the methodologies discussed herein, may be executed.

FIG. 12 illustrates a diagrammatic representation of a machine in the exemplary form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1200 includes a processing device (processor) 1202, a main memory 1204 (e.g., read-only memory (ROM), flash memory, dynamic random access memory (DRAM) such as synchronous DRAM (SDRAM) or Rambus DRAM (RDRAM), etc.), a static memory 1206 (e.g., flash memory, static random access memory (SRAM), etc.), and a data storage device 1218, which communicate with each other via a bus 1230.

Processor 1202 represents one or more general-purpose processing devices such as a microprocessor, central processing unit, or the like. More particularly, the processor 1202 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1202 may also be one or more special-purpose processing devices such as an application specific integrated circuit (ASIC), a field programmable gate array (FPGA), a digital signal processor (DSP), network processor, or the like. The processor 1202 is configured to execute the processing logic 1226 for performing the operations and steps discussed herein.

The computer system 1200 may further include a network interface device 1208. The computer system 1200 also may include a video display unit 810 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker).

The data storage device 1218 may include a machine-accessible storage medium 1231 on which is stored one or more sets of instructions (e.g., software 1222) embodying any one or more of the methodologies or functions described herein. The software 1222 may also reside, completely or at least partially, within the main memory 1204 and/or within the processor 1202 during execution thereof by the computer system 1200, the main memory 1204 and the processor 1202 also constituting machine-accessible storage media. The software 1222 may further be transmitted or received over a network 1220 via the network interface device 1208.

The machine-accessible storage medium 1231 may also be used to store data structure sets that define user identifying states and user preferences that define user profiles. Data structure sets and user profiles may also be stored in other sections of computer system 1200, such as static memory 1206.

While the machine-accessible storage medium 1231 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical, and magnetic media.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.).

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method to provide corrective maintenance, comprising:

generating a plurality of types of factors associated with a corrective maintenance event in a manufacturing process;

receiving a user selection of at least one type of factor associated with a plurality of factors;

performing a query to generate a first ranking of fixable causes that represent potential solutions to the corrective maintenance event and a second ranking of next best factors based on the selected at least one type of factor associated with the plurality of factors, wherein the first raking of the fixable causes is generated based on a fixable cause percent match determined by a number of factors associated with a fixable cause that match the selected at least one type of factor divided by a total number of factors associated with the fixable cause, and wherein the second ranking of next best factors is generated for each factor that is associated with the corrective maintenance event that was not used in the query, and wherein each next best factor is ranked based on a relative next best factor value, wherein a next best factor value is generated for a next best factor by summing, for the fixable causes, a total number of factor values for the next best factor that match values associated with each fixable cause multiplied by the corresponding fixable cause percent match associated with said each fixable cause, the second ranking indicative of the next best factors to test for refining the first ranking of fixable causes; and presenting the fixable causes in an order based on the first ranking and the next best factors in an order based on the second ranking to a user.

2. The method of claim 1, wherein the first ranking of fixable causes is associated with one or more solutions for each fixable cause.

3. The method of claim 2, wherein the query further comprises a factor associated structured troubleshooting (FAST) query to generate the first ranking of fixable causes.

4. The method of claim 1, wherein the plurality of types of factors further comprises symptom factors that are an symptoms of the corrective maintenance event at manufacturing equipment used within the manufacturing process, configuration factors that describe configurable options of the manufacturing equipment within the manufacturing process, and test factors that describe the results of a test of the manufacturing equipment performed after the corrective maintenance event.

5. The method of claim 4, further comprises:
performing a test from a plurality of test factors if test factors were previously selected as being a type of factor; and
generating a second ranking of fixable causes based on the results from the performed test.

6. The method of claim 5, further comprising:
associating one or more solutions for each fixable cause of the second ranking of fixable causes;
selecting one of the solutions; and
performing one of the solutions.

7. The method of claim 6, further comprising:
determining whether the performed solution corrects the corrective maintenance event; and
generating a third ranking of fixable causes based on results from the performed solution.

8. A non-transitory machine-accessible storage medium including data that, when accessed by a machine, cause the machine to perform a method comprising:
generating a plurality of types of factors associated with a corrective maintenance event in a manufacturing process;
receiving a user selection of at least one type of factor associated with a plurality of factors;
performing a query to generate a first ranking of fixable causes that represent potential solutions to the corrective maintenance event and a second ranking of next best factors based on the selected at least one type of factor associated with the plurality of factors,
wherein the first ranking of the fixable causes is generated based on a fixable cause percent match determined by a number of factors associated with a fixable cause that match the selected at least one type of factor divided by a total number of factors associated with the fixable cause, and
wherein the second ranking of next best factors is generated for each factor that is associated with the corrective maintenance event that was not used in the query, and wherein each next best factor is ranked based on a relative next best factor value, wherein a next best factor value is generated for a next best factor by summing, for the fixable causes, a total number of factor values for the next best factor that match values associated with each fixable cause multiplied by the corresponding fixable cause percent match associated with said each fixable cause, the second ranking indicative of the next best factors to test for refining the first ranking of fixable causes; and
presenting the fixable causes in an order based on the first ranking and the next best factors in an order based on the second ranking to a user.

9. The non-transitory machine-accessible storage medium of claim 8, wherein the first ranking of fixable causes is associated with one or more solutions for each fixable cause.

10. The non-transitory machine-accessible storage medium of claim 9, wherein the query further comprises a factor associated structured troubleshooting (FAST) query to generate the first ranking of fixable causes.

11. The machine-accessible storage medium of claim 8, wherein the plurality of types of factors further comprises symptom factors that are an symptoms of the corrective maintenance event at manufacturing equipment used within the manufacturing process, configuration factors that describe configurable options of the manufacturing equipment within the manufacturing process, and test factors that describe the results of a test of the manufacturing equipment performed after the corrective maintenance event.

12. The non-transitory machine-accessible storage medium of claim 11, the method further comprises
performing a test from a plurality of test factors if test factors were previously selected as being a type of factor; and
generating a second ranking of fixable causes based on the results from the performed test.

13. The non-transitory machine-accessible storage medium of claim 12, the method further comprising:
associating one or more solutions for each fixable cause of the second ranking of fixable causes;
selecting one of the solutions; and
performing one of the solutions.

14. The non-transitory machine-accessible storage medium of claim 13, the method further comprising:
determining whether the performed solution corrects the corrective maintenance event; and
generating a third ranking of fixable causes based on results from the performed solution.

15. A corrective maintenance system, comprising:
a database to store application data and site content data presented to a user;
a service order ticketing system to initiate a corrective maintenance event in a manufacturing process; and
processing logic to generating a plurality of types of factors associated with the corrective maintenance event, receive a user selection of at least one type of factor associated with a plurality of factors, and to
perform a query to generate a first ranking of fixable causes that represent potential solutions to the corrective maintenance event and a second ranking of next best factors based on the selected at least one type of factor associated with the plurality of factors, wherein the first raking of the fixable causes is generated based on a fixable cause percent match determined by a number of factors associated with a fixable cause that match the selected at least one type of factor divided by a total number of factors associated with the fixable cause, and wherein the second ranking of next best factors is generated for each factor that is associated with the corrective maintenance event that was not used in the query, and wherein each next best factor is ranked based on a relative next best factor value, wherein a next best factor value is generated for a next best factor by summing, for the fixable causes, a total number of factor values for the next best factor that match values associated with each fixable cause multiplied by the corresponding fixable cause percent match associated with said each fixable cause, the second ranking indicative of the next best factors to test for refining the first ranking of fixable causes, and present the fixable causes in an order based on the first ranking and the next best factors in an order based on the second ranking to a user.

16. The system of claim 15, wherein the first ranking of fixable causes is associated with one or more solutions for each fixable cause.

17. The system of claim 16, wherein the query further comprises a factor associated structured troubleshooting (FAST) query to generate the first ranking of fixable causes.

18. The system of claim 15, wherein the plurality of types of factors further comprises symptom factors that are an symptoms of the corrective maintenance event at manufacturing equipment used within the manufacturing process, configuration factors that describe configurable options of the manufacturing equipment within the manufacturing process, and test factors that describe the results of a test of the manufacturing equipment performed after the corrective maintenance event.

19. The system of claim 18, wherein the processing logic to provide a solution procedure to create a new solution for correcting the corrective maintenance event.

20. The system of claim 19, further comprising:
a validation system to validate the new solution.

* * * * *